US011618493B2

(12) United States Patent
Jackson (10) Patent No.: US 11,618,493 B2
(45) Date of Patent: Apr. 4, 2023

(54) MULTIFUNCTIONAL PORTABLE TRAY (71) Applicant: Bianca Jackson, Grosse Pointe, MI (US)

(72) Inventor: Bianca Jackson, Grosse Pointe, MI (US)

(73) Assignee: Bianca L. Jackson, Grosse Pointe, MI (US)

(*) Notice: Subject to any disclaimer, the term of this patent is extended or adjusted under 35 U.S.C. 154(b) by 103 days.

(21) Appl. No.: 17/204,163

(22) Filed: Mar. 17, 2021

(65) Prior Publication Data
US 2022/0063696 A1   Mar. 3, 2022

Related U.S. Application Data (60) Provisional application No. 63/073,976, filed on Sep. 3, 2020.

(51) Int. Cl.
    B62B 9/00    (2006.01)
    B62B 9/26    (2006.01)

(52) U.S. Cl.
    CPC .......... B62B 9/00 (2013.01); B62B 9/26 (2013.01); B62B 2202/023 (2013.01); B62B 2204/02 (2013.01); B62B 2204/04 (2013.01)

(58) Field of Classification Search
    CPC ..... B62B 2202/23; B62B 9/26; A61G 5/1094; A61G 5/10; B60N 3/104
    See application file for complete search history.

(56) References Cited

U.S. PATENT DOCUMENTS

| | | | |
|---|---|---|---|
| 4,659,099 A * | 4/1987 | Malone | A61G 5/1094 5/507.1 |
| 5,382,074 A | 1/1995 | Pietra | |
| 5,645,204 A * | 7/1997 | Struzer | B62B 9/26 224/558 |
| 6,368,006 B1 * | 4/2002 | Yang | B62B 9/26 403/93 |
| 6,932,377 B2 * | 8/2005 | Bretschger | B62B 9/00 280/47.38 |
| 7,725,966 B2 | 6/2010 | Prater et al. | |
| 7,942,437 B2 | 5/2011 | Moore | |
| 8,256,793 B1 * | 9/2012 | Krieger | B62B 9/26 280/647 |
| 8,469,388 B2 | 6/2013 | Moore | |
| 8,742,297 B2 | 6/2014 | Zakowski et al. | |

(Continued)

FOREIGN PATENT DOCUMENTS

WO    03/036193    5/2003

Primary Examiner — Emma K Frick
(74) Attorney, Agent, or Firm — Gardner Linn (57) ABSTRACT A multifunctional tray includes a portable tray housing that defines a beverage receptacle. The beverage receptacle can be selectively heated by a thermal element mounted within the tray housing. A control panel mounted to the tray housing can be used to control the heating function of the thermal element by selectively energizing the thermal element with a power source. Optionally, the tray is selectively attachable to a personal mobility device via a pair of attachment elements mounted at opposing ends of the tray housing. The tray may also include wireless connectivity capabilities that allow a user to play music and other audio entertainment from a portable electronic device through a speaker that is mounted to the tray housing.

1 Claim, 5 Drawing Sheets (56) References Cited

U.S. PATENT DOCUMENTS

| | | | |
|---|---|---|---|
| 8,866,050 B2 | 10/2014 | McBean et al. | |
| 8,973,928 B2 * | 3/2015 | Mellinger | B62B 9/26 |
| | | | 280/47.35 |
| 9,452,769 B1 | 9/2016 | Williams et al. | |
| 9,480,363 B2 | 11/2016 | Delattre et al. | |
| 9,493,102 B2 | 11/2016 | Tang | |
| 9,648,970 B2 | 5/2017 | Lee | |
| 9,669,858 B2 * | 6/2017 | Washington | B62B 9/005 |
| 9,738,300 B2 * | 8/2017 | Georgiev | B62B 9/00 |
| 10,392,044 B2 | 8/2019 | Repp | |
| 10,557,602 B1 * | 2/2020 | Dejesus | B62B 9/26 |
| 10,647,238 B2 * | 5/2020 | Park | B65D 81/18 |
| 11,008,035 B1 * | 5/2021 | Walker | B62B 9/08 |
| 11,267,379 B2 * | 3/2022 | Abreu | B60N 2/5642 |
| 2002/0167140 A1 * | 11/2002 | Pike | A63B 24/00 |
| | | | 280/47.38 |
| 2003/0132612 A1 * | 7/2003 | Pike | A63B 69/0028 |
| | | | 280/47.38 |
| 2013/0239592 A1 | 9/2013 | Lofy | |
| 2017/0349105 A1 * | 12/2017 | Karrer | B60N 3/104 |
| 2020/0039411 A1 | 2/2020 | Paschal | |
| 2021/0009184 A1 * | 1/2021 | Givens | B62B 7/04 |
| 2022/0185356 A1 * | 6/2022 | Saavedra | B62B 9/14 |

* cited by examiner

MULTIFUNCTIONAL PORTABLE TRAY

CROSS REFERENCE TO RELATED APPLICATIONS

The present application claims the benefit of U.S. provisional application Ser. No. 63/073,976, filed on Sep. 3, 2020, which is hereby incorporated herein by reference in its entirety.

FIELD OF THE INVENTION

The present invention relates to portable trays that are attachable to personal mobility devices.

BACKGROUND OF THE INVENTION

Personal mobility devices, such as baby strollers, wheelchairs, and walkers, are used by large segments of society for numerous reasons, including personal mobility assistance, or for transporting infants, the elderly, or those with special needs. To further accommodate users, these devices may include a platform or tray that provides a convenient and temporary storage area for personal items.

SUMMARY OF THE INVENTION

The present invention provides a multifunctional tray that is attachable to a personal mobility device such as a baby stroller. The tray includes beverage receptacles that can be selectively heated and cooled by a user through operation of a control panel mounted to the tray. The tray may provide additional features and conveniences that offer a more enjoyable experience to an individual using a personal mobility device.

According to one form of the invention, a multifunctional tray is attachable to a personal mobility device and includes a portable tray housing that defines a beverage receptacle. A thermal assembly, located within the tray housing, includes a thermal element mounted at the beverage receptacle for heating the beverage receptacle in order to heat a beverage as desired. The heating function of the thermal element is controlled by a control panel that can be operated to selectively energize the thermal element with a power source located within the tray housing.

In one aspect, a wireless receiver located within the tray housing receives audio signals from a portable electronic device and then transmits the audio signals to a speaker mounted to the tray housing. The speaker produces audible sounds based on the audio signal received from the wireless receiver.

In another aspect, an electrical port is electrically connected to the power source and mounted to the tray housing for charging a portable electronic device.

In yet another aspect, a screen mounted to the tray housing provides a visual indication of the temperature measured by a temperature sensor mounted at the beverage receptacle.

In still another aspect of the invention, the tray housing further includes an attachment structure for releasably attaching the tray to the personal mobility device. The attachment structure has movable fastener arms and fixed fastener arms. The fastener arms can be closed around a portion of a personal mobility device to secure the tray to the personal mobility device.

In a further aspect of the invention, the thermal element is a thermoelectric module that can to provide heating and cooling. Optionally, the thermal element is a resistive heater, or the thermal assembly is a heat pump that provides heating and cooling.

In an additional aspect of the invention, the power source is a rechargeable battery.

In another form of the invention, a multifunctional tray includes a tray housing that defines a storage compartment located between a pair of beverage receptacles that are also defined by the tray housing. The tray housing also includes a pair of attachment structures for releasably attaching the tray to a baby stroller. A pair of resistive heaters located within the tray housing are mounted at each beverage receptacle and are powered by a rechargeable battery that is also located within the tray housing. A speaker is mounted to the upper surface of the tray housing, between the beverage receptacles, and produces audible sounds based on an audio signal received from a wireless receiver located within the tray housing. A pair of control panels, mounted to the tray housing, are operable to control the heating functions of the resistive heaters. A pair of screens, also mounted to the tray housing, provide a visual indication of the temperatures measured by a pair of temperature sensors mounted at the beverage receptacles and/or the temperatures set by a user. A pair of USB ports, electrically connected to the rechargeable battery, are mounted to opposing ends of the tray housing for charging a portable electronic device.

Therefore, the multifunctional stroller tray of the present invention affords a user of a personal mobility device increased enjoyment by providing features and conveniences including temperature-controlled beverage receptacles. Optionally, the tray may include mobile charging for a personal mobility device and the ability to listen to music and other audio entertainment while traveling with or otherwise using the personal mobility device.

These and other objects, advantages, purposes, and features of the present invention will become apparent upon review of the following specification in conjunction with the drawings.

DESCRIPTION OF THE PREFERRED EMBODIMENTS

The present invention is directed to a multifunctional tray for selective attachment to a personal mobility device such as a stroller, walker, or wheelchair. The tray includes various beneficial features such as beverage receptacles that can be heated and/or cooled through operation of a control panel or control element, a screen that provides visual information relating to the current and/or set temperatures of the beverage receptacles, a wireless receiver for receiving signals from a portable electronic device, a speaker for playing music and other audio entertainment, USB ports for charging a portable electronic device, and attachment elements that secure the tray to a wide variety of personal mobility devices. While the multifunctional tray is described primarily for attachment to a baby stroller, it should be understood that the tray may be used with other types of personal mobility devices.

Figure 1:
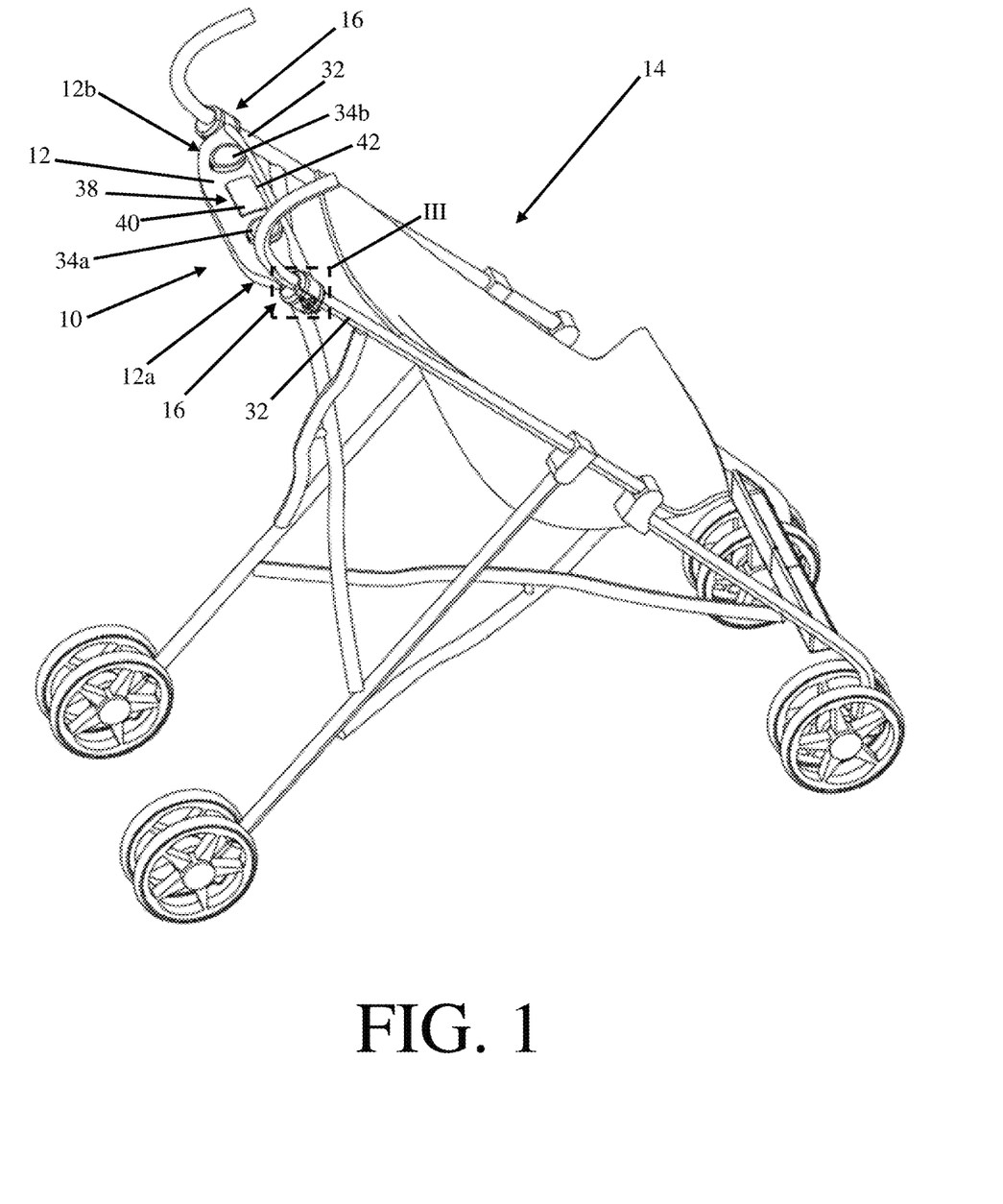
FIG. 1 is a perspective view of a multifunctional tray in accordance with the present invention, shown attached to a stroller.
Figure 2:
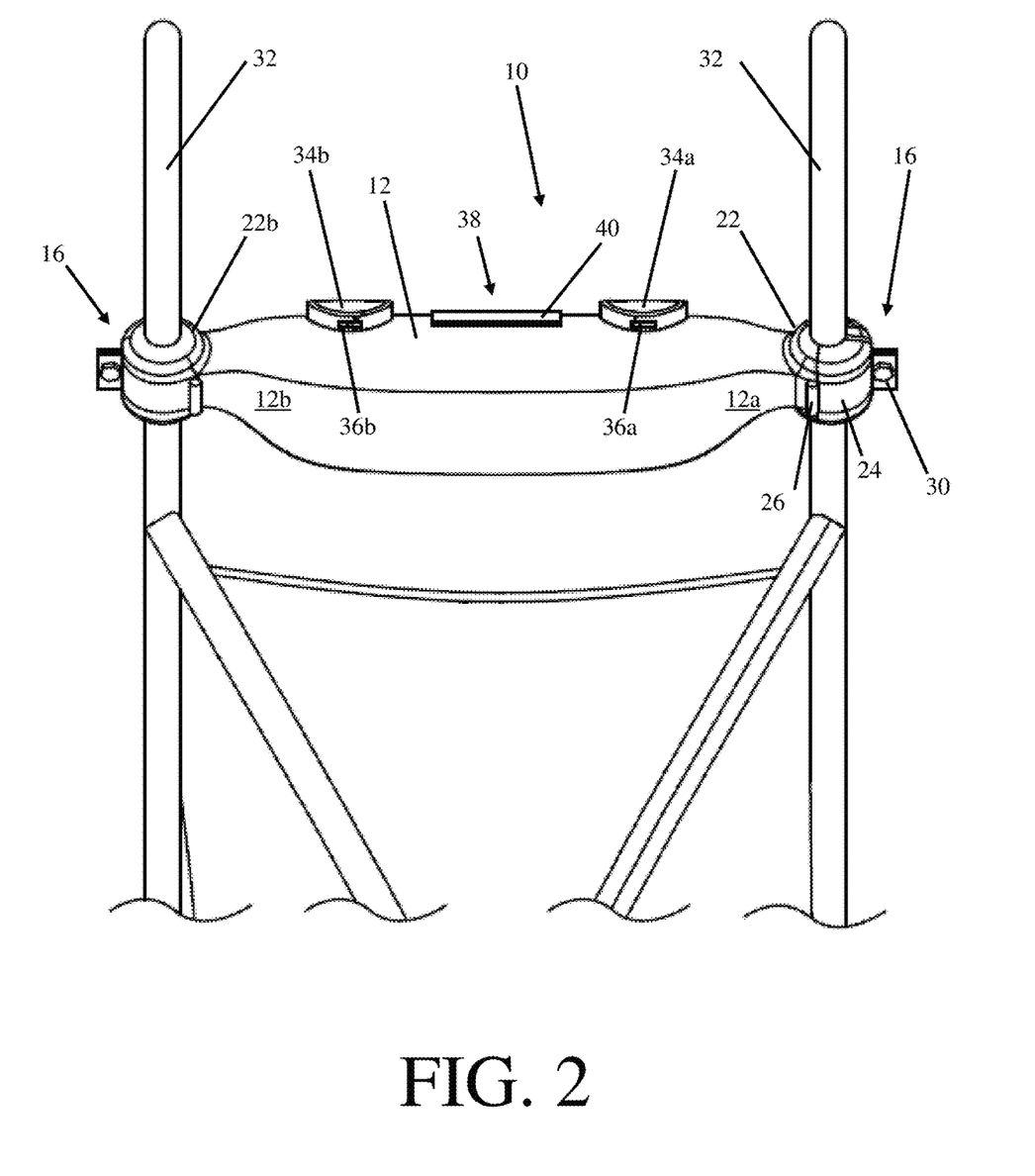
FIG. 2 is an enlarged rear elevation view of the multifunctional tray of FIG. 1.
Figure 3:
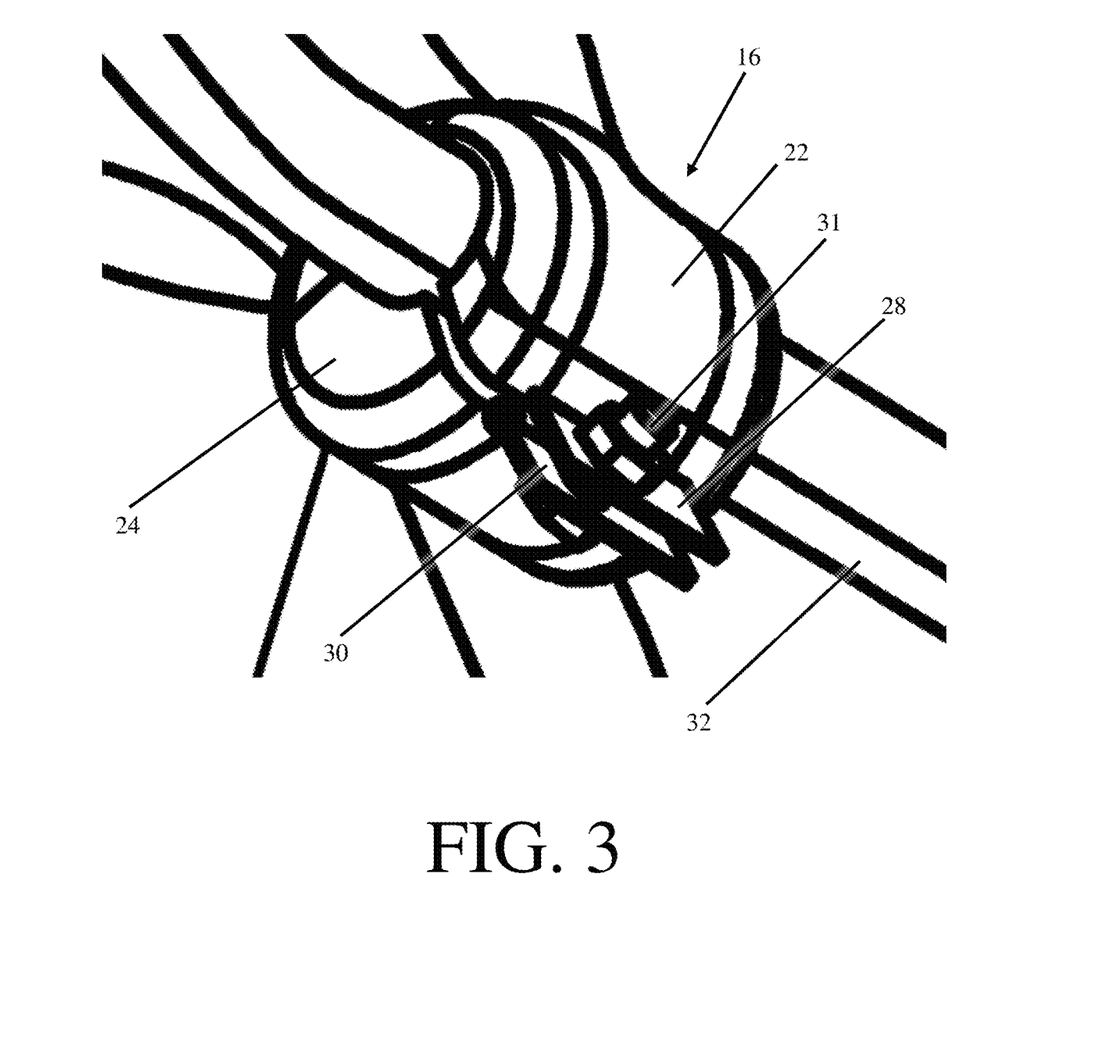
FIG. 3 is an enlarged view of the area designated III in FIG. 1, depicting an attachment element of the multifunctional tray of FIG. 1.

Referring now to the drawings and the illustrative embodiments depicted therein, a multifunctional tray 10 includes a portable tray housing 12 that can be attached to a personal mobility device, such as a stroller 14, through a pair of attachment elements 16 (FIGS. 1-3). Attachment elements 16 are located on opposing first and second end portions 12a, 12b of tray housing 12, and are operable to selectively attach tray 10 to stroller 14. Each attachment element 16 includes a fixed fastener arm 22, a movable fastener arm 24, and a hinge 26 (FIG. 2). Fixed fastener arm 22 terminates in a fixed flange 28 (FIG. 3) and has a curved shape to provide a complimentary seating surface for receiving a post 32 of stroller 14. Movable fastener arm 24 is rotatably coupled to tray housing 12 via hinge 26, and terminates in a movable flange 30. After post 32 of stroller 14 has been received in the seating surface of fixed fastener arm 22, movable fastener arm 24 may be rotated about hinge 26 to a closed position. In the closed position, fixed fastener arm 22 and movable fastener arm 24 fully enclose a portion of post 32 of stroller 14, and fixed flange 28 and movable flange 30 come into contact with one another as shown in FIG. 3. Fixed flange 28 and movable flange 30 may then be secured together through one or more fasteners such as a bolt 31, or a thumbscrew, a quick-release clamp, or any other similar means.

It should be appreciated that alternative forms of attachment elements could be used to secure the tray to a personal mobility device. For example, a tray housing could define a channel that receives and secures a portion of a personal mobility device through means of a detent element or press-fit interface. In another alternative form, one end of a Velcro® strap could be attached to a tray housing, then wrapped around a portion of a personal mobility device and secured to itself to attach a tray to the personal mobility device. Certain embodiments of a multifunctional tray may also include a width adjustment arm at each opposing side of the tray for coupling attachment structures to the tray. The width adjustment arms may be extended and retracted horizontally to adapt to personal mobility devices with posts spaced apart at varying distances. This enables the attachment structures to attach to a variety of different types of personal mobility devices.

Tray housing 12 defines a cylindrical beverage receptacle or cup holder 34a, 34b at each of the first and second end portions 12a, 12b of tray housing 12 (FIGS. 1 and 2). As shown in FIGS. 1 and 2, upper portions of cup holders 34a, 34b extend above the upper surface of tray housing 12 to increase the contact area between interior wall surfaces of cup holders 34a, 34b and a stored beverage container, such as a baby bottle or coffee cup, and to provide additional support and stability to the stored beverage container.

Cup holders can take many forms without departing from the spirit and scope of the present invention. In one possible form, flexible flanges of rubber or a similar elastic material, or a hinged member of a rigid material, could be attached near the top of a cup holder to provide additional support to a stored beverage container and an improved ability to accommodate beverage containers of different shapes and sizes such as baby bottles, bottles of water, cans of soda, or thermally-insulated mugs. A cup holder could also take the form of an insert that slides into a recessed cavity or hole defined by a tray housing. In this form, inserts of different shapes and sizes could be placed into the recessed cavity or hole to accommodate a wide variety of beverage containers. Furthermore, a multifunctional tray may include cup holders that are disposed in different locations on a tray housing or are mounted to the side of a tray housing. In certain embodiments, cup holders may be insulated to reduce thermal transfer between a stored beverage container and the external environment.

Controls in the form of a first switch 36a and a second switch 36b (FIG. 2) are mounted to the upper portions of respective cup holders 34a, 34b and are in electrical communication with a power supply and a pair of thermal elements. Turning on first switch 36a electrically connects the power supply to a first thermal element mounted at cup holder 34a. Once electrically connected to the power supply, the first thermal element begins to heat cup holder 34a. Turning off first switch 36a electrically disconnects the power supply from the first thermal element to discontinue the heating of cup holder 34a. Operation of second switch 36b is the same as first switch 36a to control the heating of second cup holder 34b via a second thermal element. It is envisioned that the power supply and thermal elements of this embodiment will be arranged in a similar manner as described with regard to an embodiment depicted in FIGS. 4 and 5, such that those components may be more fully understood with reference to the description below.

It should be recognized that the control elements and thermal system described could take alternative forms while remaining within the scope of the present invention. For example, a control element could be a potentiometer in the form of a dial that allows a user to adjust the electrical power supplied to a thermal element. In this form, a user can adjust the heating output of the thermal element from a maximum desired temperature to a minimum desired temperature. Optionally, a control panel could have buttons for increasing and decreasing the heating output of a thermal element, such as in a manner that will be described below. Furthermore, a thermal element could take the form of either a fluid compressor-based assembly or a thermoelectric-based assembly providing both heating and cooling to cup holders 34a, 34b. In another alternative form, a tray housing could include a pouch or holding cavity adjacent to a cup holder or within a cup holder for storing a hot or cold thermal pack. In this form, heat transfer to and/or from the cup holder would take place once the thermal pack is placed in the holding cavity. A microwave or a freezer could be used to heat or cool the thermal pack prior to placing the thermal pack in the holding cavity. Alternatively, a thermal pack could include a chemical composition having the ability to undergo an endothermic or exothermic chemical reaction to provide heat transfer to and/or from the cup holder once placed in the holding cavity.

Referring once again to FIGS. 1 and 2, a storage compartment 38 is located between cup holders 34a, 34b to provide a convenient storage space for small items, such as a portable electronic device or keys. Storage compartment 38 includes a rectangular-shaped recessed cavity, defined by tray housing 12, and a cover 40 rotatably coupled to an upper surface of tray housing 12 at a forward end 42 of storage compartment 38. Cover 40 is rotatable to selectively cover the recessed cavity to prevent inadvertent loss of items stored within storage compartment 38 while also offering added protection to stored items from environmental factors such as rain or other forms of precipitation.

A storage compartment may take many forms without departing from the scope of the present invention. For example, a storage compartment may include a recessed cavity that incorporates grooves and flanges designed to more conveniently store and organize specific items such as coins or pens. Additionally, a multifunctional tray may include more than one storage compartment. Optionally, a cover for a storage compartment may selectively cover a recessed cavity by sliding horizontally rather than being rotated. A storage compartment could also take the form of a drawer, coupled to a lower surface of a tray housing, which drawer is slidable between an open position and a closed position.

Figure 4:
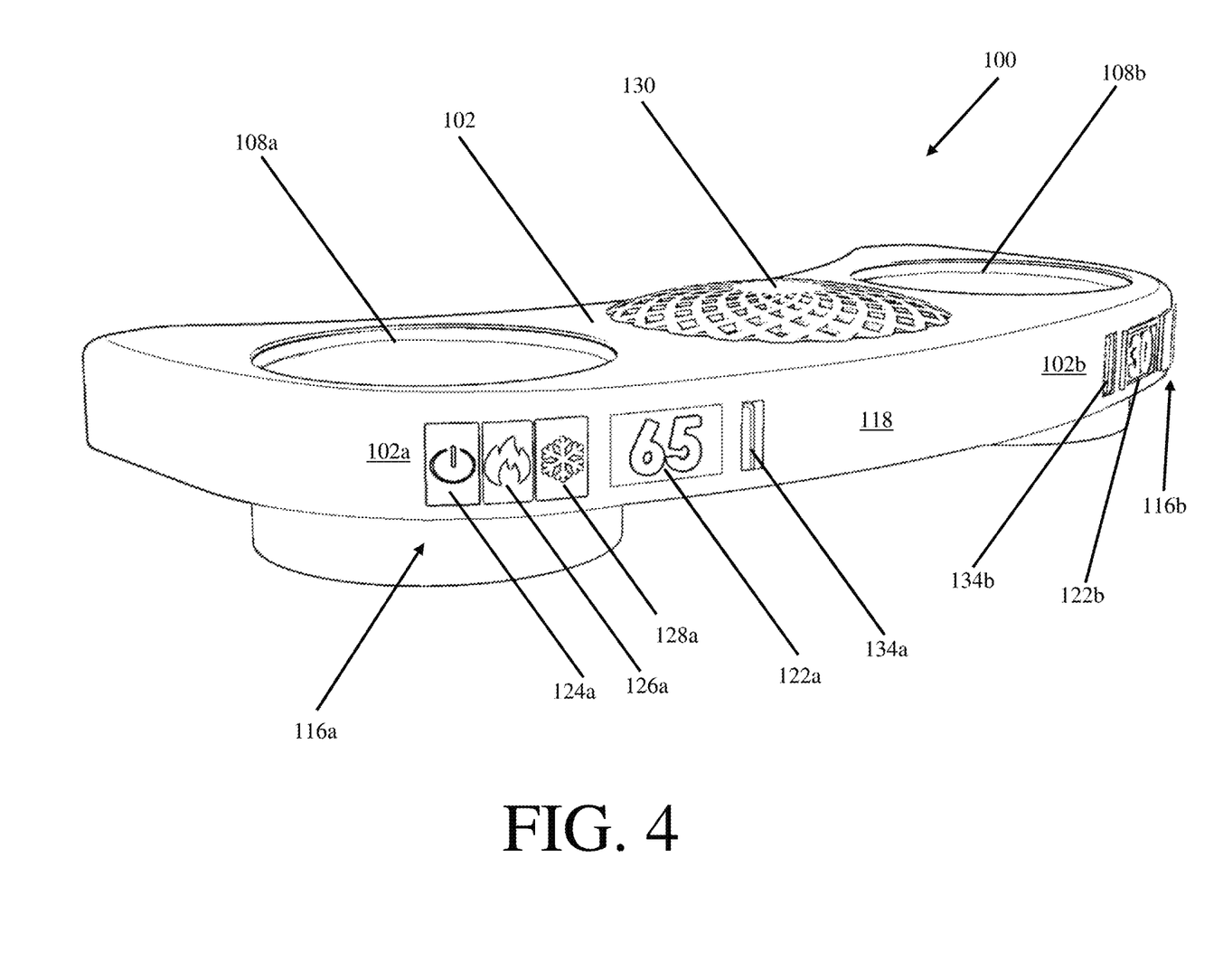
FIG. 4 is a rear perspective view of another multifunctional tray in accordance with the present invention.
Figure 5:
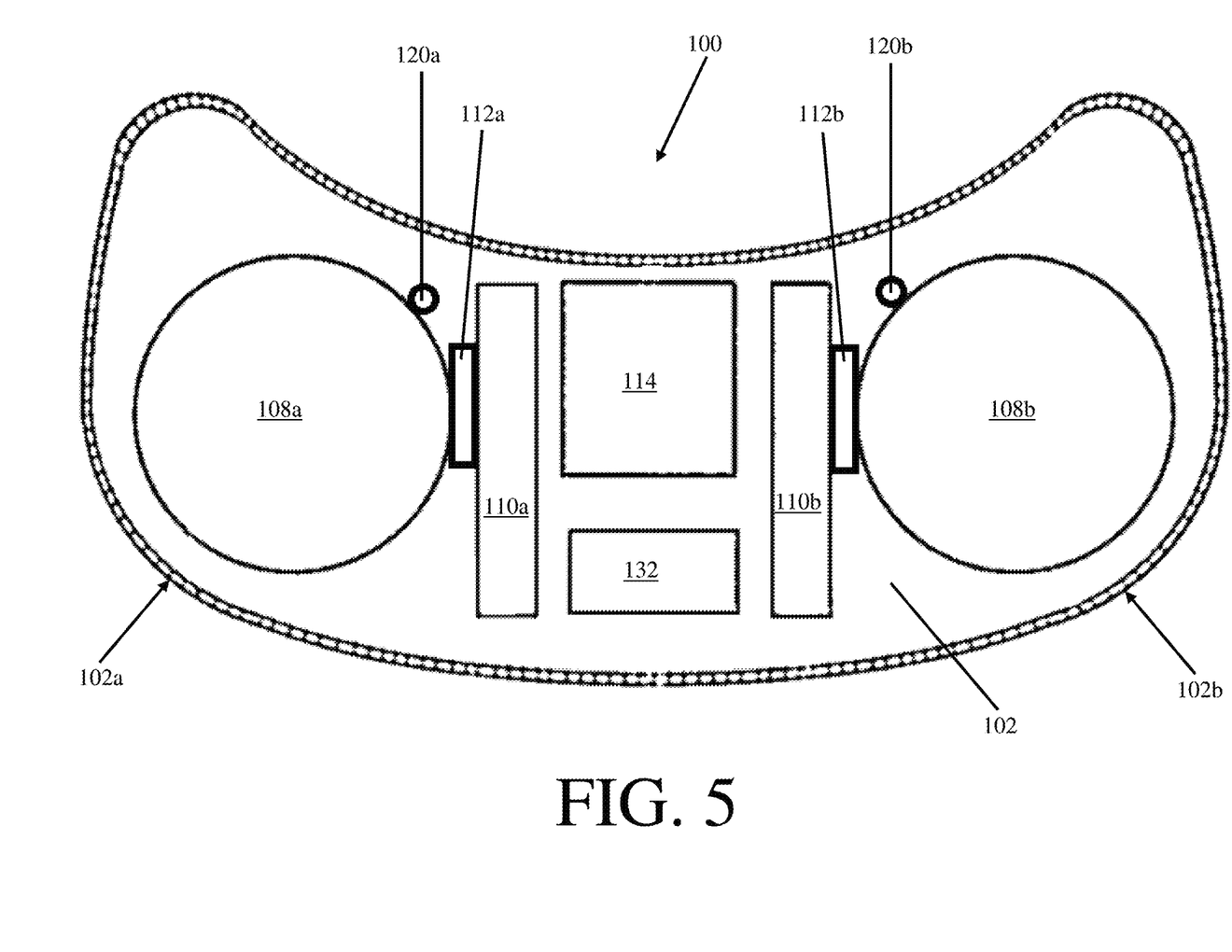
FIG. 5 is a top plan view of the multifunctional tray of FIG. 4 and depicting internal components.

Referring now to FIGS. 4 and 5, another multifunctional tray 100 is attachable to a personal mobility device and includes a portable tray housing 102 having a first end portion 102*a* and a second end portion 102*b*. A pair of attachment elements (not shown) are incorporated into tray housing 102 at each of the first end portion 102*a* and the second end portion 102*b*, and can selectively attach tray 100 to a personal mobility device such as a baby stroller. The attachment elements could take on numerous forms within the scope of the present invention, such as those previously discussed with respect to the first multifunctional tray embodiment depicted in FIGS. 1 and 2. For example, an attachment element could include a groove or passageway defined by a tray housing in which the groove or passageway receives and secures a portion of a personal mobility device via a press fit engagement. Optionally, the groove or passageway could include a detent capable of engagement with a portion of a personal mobility device received by the groove to secure a multifunctional tray to the personal mobility device.

Tray housing 102 defines a cylindrical beverage receptacle or cup holder 108*a*, 108*b*, at each of the first and second end portions 102*a*, 102*b* of tray housing 102 (FIG. 4). Cup holders 108*a*, 108*b* can be used to store a wide variety of beverage containers including baby bottles, coffee cups, water bottles, soda cans, and insulated mugs. To provide additional support to a stored beverage container, a lower portion of each cup holder 108*a*, 108*b* extends below a lower surface of tray housing 102 to increase the contact area between interior wall surfaces of cup holders 108*a*, 108*b* and a stored beverage container and also lower the center of gravity of the stored beverage container relative to an upper surface of tray housing 102. It should be understood that cup holders may take alternative forms, as previously described, while remaining within the scope of the present invention.

A pair of thermal assemblies in the form of thermoelectric assemblies 110*a*, 110*b* (FIG. 5) are substantially located within tray housing 102. Each thermoelectric assembly 110*a*, 110*b* includes a thermal element in the form of a thermoelectric module 112*a*, 112*b* (i.e., a Peltier module), and may optionally include a heat sink with heat fins, a heat sink fan, and thermal interface materials. Thermoelectric modules 112*a*, 112*b* are powered by a power source in the form of a rechargeable battery 114, such as a lithium-ion battery. The heating and cooling functionality of each thermoelectric module 112*a*, 112*b* is independently controlled by a user through operation of a pair of control panels 116*a*, 116*b*. For descriptive purposes, the operation and interrelated functionality of first control panel 116*a*, first thermoelectric module 112*a*, first cup holder 108*a*, a first temperature sensor 120*a*, and a first screen 122*a* will be discussed. However, it should be understood that the operation, characteristics, and interrelated functionality will be the same for the counterpart components, including second thermoelectric module 112*b*, second cup holder 108*b*, a second temperature sensor 120*b*, and a second screen 122*b*.

Thermoelectric module 112*a* is mounted in close thermal contact with a portion of cup holder 108*a* (FIG. 5). Because thermoelectric modules have bipolar properties, thermoelectric module 112*a* is capable of providing both heating and cooling to cup holder 108*a* depending on the direction of electric current flow through thermoelectric module 112*a*. The amount of thermal energy transferred to or away from cup holder 108*a* can also be controlled depending on the amount of electric current flowing through thermoelectric module 112*a*. Due to these properties, control panel 116*a* can be operated to control both the direction and amount of heat transfer between thermoelectric module 112*a* and cup holder 108*a*, and therefore to a stored beverage container and its liquid beverage.

There are many arrangements of common electrical components known in the art that can be used in conjunction with control panel 116*a* to vary the direction and amount of electric current flowing through thermoelectric module 112*a*. For example, an electrical circuit could include one or more electrical switches that can be controlled through operation of control panel 116*a* to allow electric current to flow from rechargeable battery 114 through thermoelectric module 112*a* in a desired direction and at certain time intervals. A pulse width modulation device could also be incorporated into an electrical circuit and controlled to regulate the amount of electric current that flows through thermoelectric module 112*a*.

Thermoelectric assembly 110*a* may optionally include heat sinking to reject waste heat produced by thermoelectric module 112*a* as a result of cooling cup holder 108*a*. There are many forms of heat sinks known in the art that could be utilized to reject waste heat. For example, thermoelectric assembly 110*a* may include an extruded aluminum heat sink with heat fins mounted to one side of thermoelectric module 112*a*. A fan could optionally be mounted to the heat sink to transfer waste heat from the heat sink to the ambient environment through forced convention.

Thermoelectric assemblies 110*a*, 110*b* and thermoelectric modules 112*a*, 112*b* may take on alternative forms while remaining within the scope of the present invention. For example, a thermal assembly could include a compressor-based heating and cooling system or a liquid recirculation system, in which the fluid or liquid could be heated or cooled at a location remote from cup holders 108*a*, 108*b* before being circulated to cup holders 108*a*, 108*b* to provide heating and cooling. As previously described, thermal elements could also be resistive heaters that are only operable to heat cup holders 108*a*, 108*b*, or thermal packs that may heat and/or cool cup holders after being placed in a cup holder or a holding cavity adjacent to a cup holder.

Control panel 116*a*, mounted to the first end portion 102*a* of a forward side 118 of tray housing 102, controls the heating and cooling functionality of thermoelectric module 112*a* by energizing thermoelectric module 112*a* with rechargeable battery 114 (FIG. 5). Control panel 116*a* includes a first power button 124*a*, a first heating button 126*a*, and a first cooling button 128*a*. Power button 124*a* can be used to switch the electrical power on and off between rechargeable battery 114 and thermoelectric module 112*a*. When switched on, thermoelectric module 112*a* is electrically connected to rechargeable battery 114. When switched off, thermoelectric module 112*a* is electrically disconnected from rechargeable battery 114. Heating button 126*a* and cooling button 128*a* can be used to adjust cup holder 108*a* to a desired set temperature. For example, a user can warm a baby bottle stored in cup holder 108a by pressing heating button 126a until a desired set temperature of cup holder 108a is reached. A user can also cool a bottled beverage stored in cup holder 108a by pressing cooling button 128a until a desired set temperature of cup holder 108a is reached. A user may similarly adjust the set temperature of second cup holder 108b, independently of first cup holder 108a, to heat and/or cool a beverage stored in second cup holder 108b independently of the heating or cooling of the beverage in first cup holder 108a. For example, a baby bottle containing milk could be heated to 98 degrees Fahrenheit in first cup holder 108a, while a different beverage could be simultaneously cooled to 50 degrees Fahrenheit in second cup holder 108b for an adult pushing a baby stroller.

It should be recognized that control panels 116a, 116b can take on many alternative forms within the scope of the present invention. For example, a temperature dial could be used to increase or decrease the set temperature of a cup holder. Alternatively, the set temperature could be adjusted wirelessly through a portable electronic device connected to a wireless receiver located within a tray housing. The wireless receiver would adjust the level of active heating and cooling provided by a thermal assembly to a cup holder upon receiving a command from the portable electronic device. Additional buttons may be added to a control panel to control other functions of a multifunctional tray. For example, these buttons could include buttons to increase or decrease the volume of a speaker connected to a tray, or a connectivity button that places a wireless receiver, such as a Bluetooth® receiver, in a pairing mode to connect to a portable electronic device. Optionally, a tray may include a single control panel that is operable to control all of the aforementioned functions. It should also be recognized that a control panel could be mounted to portions of a multifunctional tray other than the locations depicted in FIG. 4.

Screen 122a is mounted to the first end portion 102a of the forward side 118 of tray housing 102 and is in electrical communication with rechargeable battery 114 (FIGS. 4 and 5). In a default state, screen 122a displays the current temperature of cup holder 108a as measured by temperature sensor 120a. However, screen 122a will temporarily display the current set temperature when a user adjusts the set temperature by pressing either heating button 126a or cooling button 128a. In addition to switching thermoelectric module 112a on and off, as previously described, power button 124a also switches screen 122a on and off. When switched on, screen 122a is electrically connected to rechargeable battery 114 and displays the current and/or set temperatures of cup holder 108a as described above. When switched off, screen 122a displays nothing, and is electrically disconnected from rechargeable battery 114.

It should be understood that screens 122a, 122b may take alternative forms and can display additional information while remaining within the scope of the present invention. For example, a single, larger screen may display the current and/or set temperatures of both cup holders 108a, 108b. Another alternative screen may take the form of a touch-screen with touch controls to control the power and heating and cooling functions of thermoelectric modules 112a, 112b. Optionally, additional information such as the remaining battery life of rechargeable battery 114, or information from a portable electronic device, such as the remaining battery life of the portable electronic device, may be displayed. A screen could also be mounted to alternative locations on a multifunctional tray while remaining within the scope of the present invention.

As shown in FIG. 5, temperature sensor 120a is mounted at a location near cup holder 108a such that it is able to measure the current temperature of a portion of cup holder 108a. Optionally, a thermal interface material known in the art, such as zinc oxide thermal paste or a graphite pad, may be disposed between temperature sensor 120a and the outer surface of cup holder 108a to minimize the temperature gradient, and therefore the measurement error, between the actual temperature of the portion of cup holder 108a sought to be measured and the temperature measured by temperature sensor 120a. Temperature sensor 120a may take the form of a thermocouple, a thermistor, or another temperature measurement device that yields an electrical signal that varies predictably based on temperature. The electrical signal from temperature sensor 120a may be read by a processor that converts the electrical signal into a digital signal that can then be displayed by screen 122a.

It should be appreciated that the mounting location and mounting method of temperature sensor 120a may vary while remaining within the scope of the present invention. A temperature sensor may be mounted near the bottom of a cup holder, or alternatively, near a specific side of a cup holder. A temperature sensor may also be embedded into a portion of a cup holder, or even protrude through a cup holder to make contact with a stored beverage container to produce a more accurate temperature measurement of the stored beverage container.

Second control panel 116b, second thermoelectric module 112b, second cup holder 108b, second temperature sensor 120b, and second screen 122b are disposed in an opposite symmetrical fashion at second end portion 102b of tray housing 102 relative to their identical counterpart components at the first end portion 102a and have the same characteristics, interrelated functionality, and operate in the same manner as has been described above. It should also be recognized that a multifunctional tray could exist in a form in which some of these components are combined yet still maintain the same functionality. For example, a single screen could display the current and/or set temperatures of cup holders 108a, 108b at the same time. Additionally, a single control panel could control the heating and cooling of cup holders 108a, 108b independent of one another. Finally, a touch-screen could display and control the temperatures of cup holders 108a, 108b in a multifunctional tray without departing from the spirit and scope of the present invention.

As shown in FIGS. 4 and 5, a speaker 130 mounted into the upper surface of tray housing 102 between cup holders 108a, 108b is electrically connected to rechargeable battery 114. Speaker 130 produces audible sounds based on an audio signal received from a wireless receiver 132 located within tray housing 102. Wireless receiver 132 receives audio signals from a portable electronic device, such as a cell phone, and then transmits the audio signal to speaker 130. Wireless receiver 132 can be a Bluetooth® receiver or similar technology capable of receiving and/or transmitting wireless signals. A wireless receiver may also receive and transmit additional data from a portable electronic device, such as the current time or the remaining battery life of the portable electronic device. In certain embodiments, a speaker could also be mounted to a side of a multifunctional tray. In this form, a multifunctional tray would have room for additional components on its upper surface such as a storage compartment. Furthermore, multiple speakers could be mounted to a multifunctional tray without departing from the scope of the present invention.

A pair of USB type-A ports 134a, 134b are mounted to the forward side 118 of tray housing 102 at the first end portion 102a and the second end portion 102b respectively (FIG. 4). USB ports 134a, 134b are electrically connected to rechargeable battery 114 and can be connected to a portable electronic device, such as a cell phone, by a charging cable. A portable electronic device may be charged upon connection to either USB port 134a or 134b.

It should be understood that a multifunctional tray may have electronic data and/or electrical power ports with additional functionalities within the scope of the present invention. For example, a multifunctional tray may have USB ports that also have the ability to send and receive data from a portable electronic device. In this form, a USB port could receive data from a portable electronic device, such as the current time or the remaining battery life of the portable electronic device, and transmit this information to a screen attached to a tray housing for visual display to a user of the multifunctional tray. Furthermore, other types of ports, such as a USB type-C port, a mini USB port, or a 3.5 millimeter jack, can be included as part of a multifunctional tray without departing from the scope of the present invention.

Accordingly, the multifunctional tray of the present invention provides features that make the experience of using a personal mobility device more convenient and enjoyable. The tray includes beverage receptacles that can be controlled by a control panel to heat and/or cool a stored beverage to a desired temperature. The tray may also include wireless connectivity capabilities that allow a user to play music and other audio entertainment through a speaker that is mounted to the tray. Optionally, a pair of electrical power ports can be used to charge a portable electronic device, such as a cell phone. The tray may further include attachment structures that allow the tray to be selectively attached to a personal mobility device.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A multifunctional stroller tray attachable to a baby stroller, said multifunctional stroller tray comprising:
   a tray housing having opposite end portions defining respective beverage receptacles;
   a recessed cavity defined by said tray housing between said beverage receptacles;
   a cover at said recessed cavity and pivotable about a hinged axis between open and closed positions;
   an attachment element at each of said opposite end portions of said tray housing and operable to selectively attach and detach to respective portions of the baby stroller;
   a resistive heater mounted within said tray housing at each of said beverage receptacles;
   a rechargeable battery mounted within said tray housing and in selective electrical communication with said resistive heaters;
   a speaker mounted to said tray housing between said beverage receptacles and in electrical communication with said rechargeable battery;
   a control panel mounted at each of said opposite end portions of said tray housing and operable to control the respective temperatures of said resistive heaters by selectively energizing said resistive heaters with said rechargeable battery;
   a temperature sensor in communication with each of said control panels and configured to sense the temperature of each of said beverage receptacles;
   a screen mounted at each of said opposite end portions of said tray housing and configured to provide visual indication of the temperature sensed by each of said temperature sensors;
   a wireless receiver mounted within said tray housing and in electrical communication with said rechargeable battery, and operable to direct audio signals received from a portable electronic device to said speaker; and
   a USB port mounted to each of said opposite end portions of said tray housing and in electrical communication with said rechargeable battery, and connectable to the portable electronic device.

* * * * *